US006593029B2

(12) United States Patent
Spillman et al.

(10) Patent No.: US 6,593,029 B2
(45) Date of Patent: Jul. 15, 2003

(54) MANUFACTURING PROCESS FOR IMPROVED DISCHARGE OF LITHIUM-CONTAINING ELECTROCHEMICAL CELLS

(75) Inventors: David M. Spillman, Tonawanda, NY (US); Hong Gan, East Amherst, NY (US); Esther S. Takeuchi, East Amherst, NY (US)

(73) Assignee: Wilson Greatbatch Ltd., Lancaster, NY (US)

( * ) Notice: Subject to any disclaimer, the term of this patent is extended or adjusted under 35 U.S.C. 154(b) by 213 days.

(21) Appl. No.: 09/809,371

(22) Filed: Mar. 15, 2001

(65) Prior Publication Data
US 2002/0136947 A1 Sep. 26, 2002

(51) Int. Cl.$^7$ .................................. H01M 6/04
(52) U.S. Cl. ................. 429/188; 429/217; 429/219; 429/220; 429/221; 429/223; 429/224; 429/231.1; 429/231.2; 429/231.3; 429/231.5; 429/231.95; 429/326; 429/330; 429/332; 429/232; 29/623.2
(58) Field of Search ..................... 429/326, 231.95, 429/231.1, 231.5, 231.2, 217, 232, 330, 188, 231.3, 219, 220, 221, 223, 224, 332; 29/623.2

(56) References Cited

U.S. PATENT DOCUMENTS

| 4,853,304 A | 8/1989 | Ebner et al. ................. 429/192 |
| 5,569,558 A | 10/1996 | Takeuchi et al. ............ 429/122 |

Primary Examiner—Laura Weiner
(74) Attorney, Agent, or Firm—Michael F. Scalise

(57) ABSTRACT

In primary cells, the addition of gaseous carbon dioxide to the nonaqueous electrolyte has beneficial effects in terms of minimizing or eliminating voltage delay and reducing Rdc build-up when the cell is subjected to pulse current discharge conditions. For secondary systems, carbon dioxide provided in the electrolyte benefits cycling efficiency. The problem is that carbon dioxide readily degases from an electrolyte prepared under an ambient atmosphere. To prevent this, the carbon dioxide-containing electrolyte is prepared and stored in a carbon dioxide atmosphere. Also, the thusly prepared electrolyte is filed into the casing in a carbon dioxide-containing atmosphere. This prevents degassing of the additive from the electrolyte.

33 Claims, No Drawings

//MANUFACTURING PROCESS FOR IMPROVED DISCHARGE OF LITHIUM-CONTAINING ELECTROCHEMICAL CELLS

BACKGROUND OF THE INVENTION

1. Field of the Invention

This invention generally relates to the conversion of chemical energy to electrical energy. More particularly, the present invention pertains to primary lithium/silver vanadium oxide (Li/SVO) cells with improved voltage delay characteristics and lithium-containing secondary cells with improved cycling efficiency. According to the present invention, the activating electrolyte for these electrochemical systems is provided with a gaseous additive for the purpose of beneficially modifying the lithium passivation film. Additionally, electrolyte preparation is carried out in an atmosphere of the gaseous material. This ensures that the intended concentration of the additive in the electrolyte is maintained. Furthermore, lithium-containing primary and secondary cells are activated by filling the additive-containing electrolyte into the casing in the same gaseous additive atmosphere. These procedures significantly improve the voltage delay characteristics of a Li/SVO cell and the cycling efficiency characteristics of a lithium-containing secondary cell in comparison to prior art cells of similar chemistries because very little, if any, of the gaseous additive evaporates from the electrolyte. Essentially, the intended concentration of addition is maintained in the electrolyte to improve the voltage delay and cycling characteristics of the respective cells.

2. Prior Art

Many implantable medical devices use a power source which consists, in part, of a primary lithium electrochemical cell. In most instances, the primary cell is of a lithium/silver vanadium oxide couple. This chemistry has proven to be a reliable and dependable power source which can, if needed, deliver a pulse current discharge such as is required by implantable cardiac defibrillators.

Recently, the pulse current discharge of Li/SVO electrochemical cells has been improved by the provision of various types of additives to the electrochemical chemistry. These additives help alleviate, and in some cases eliminate, the voltage delay phenomenon present during various stages of cell discharge. Voltage delay manifests itself as a temporary decrease in cell voltage during application of a pulse current. It is generally attributed to an increase in the resistance of the lithium passivation layer on the surface of the anode electrode which impedes the flow of lithium ions from the anode into the electrolyte during pulse current discharge and results in a temporarily lower voltage exhibited by the cell. In some instances, the life of the implantable device may be severely reduced.

Modification of the anode passivation layer by the inclusion of an additive in the electrochemical chemistry results in the formation of an ionically conductive protective film thereon. This protective film greatly reduces, or even eliminates, the voltage delay phenomenon, and is primarily accomplished by the formation of a salt of one of a number of additives classified as nitrites, nitrates, carbonates, dicarbonates, phosphonates, phosphates, sulfates, and sulfites on the surface of the lithium metal. The resulting salt is more conductive than lithium oxide which may form on the anode in the absence of the electrolyte additive. In fact, it is believed that the lithium additive salt or lithium salt of the additive reduction product on the surface of the anode provides for the existence of charge delocalization due to resonance equilibration at the anode surface. This equilibration allows lithium ions to travel easily from one molecule to the other via a lithium ion exchange mechanism. As a result, beneficial ionic conductance is realized.

Several methods of beneficially modifying the lithium passivation film have been shown to be successful. These include exposing freshly scraped lithium metal to a gaseous form of the additive prior to inclusion of the active material into the cell assembly, providing a solid form of the additive, when appropriate, in the electrolyte or dissolving a gaseous form of the additive into the electrolyte. These and other methods may be employed alone or in combination with each other.

One method in particular is preferred because of its lower cost. This involves saturating the electrolyte with a gaseous form of the additive. For example, when the additive is a carbonate, carbon dioxide is easily saturated into the electrolyte. The modified passivation layer on the surface of the anode electrode forms in-situ when and immediately after the cell is filled with the electrolyte.

Although process economics favor the use of an electrolyte that is saturated with gaseous carbon dioxide for alleviating the voltage delay phenomenon, application of this method to defibrillator batteries has yet to occur. Previously, lithium cells activated with such an electrolyte exhibited inconsistent improvements in alleviating the voltage delay phenomenon. Although lithium cells containing a nonaqueous electrolyte saturated with carbon dioxide do not exhibit worsened voltage delay than historically observed, improvements are not consistently observed from one cell to the next and from batch to batch. Such unpredictability is not acceptable for cells intended to power implantable medical devices, such as cardiac defibrillators.

Concentration measurements suggest that the inconsistent effects are due to the processes used to make and store the electrolyte and to fill the cell. Specifically, it has been determined that gaseous carbon dioxide degasses from the electrolyte during storage and during vacuum filling of the cell. The degassing effect becomes more pronounced over time and results in a significant difference in concentration levels from lot to lot, and even in cells activated with the same electrolyte lot. In essence, cells activated with the same electrolyte lot contain varying amounts of dissolved carbon dioxide, and this results in inconsistent alleviation of the voltage delay phenomenon. This also results in variations in the cycling efficiency from one secondary cell to the next.

The reason for this in a primary cell is that during the application of a series of pulse currents, the passivation layer on the anode electrode is disrupted, resulting in the loss of some lithium carbonate species from the surface film. After the pulsing is completed, the passivation layer reforms using an additional amount of dissolved carbon dioxide within the electrolyte to re-form the lithium carbonate surface species via reaction with freshly exposed lithium metal. When all of the dissolved carbon dioxide is reacted, which occurs prematurely in cells filled towards the end of an electrolyte lot and from which appreciable amounts of dissolved carbon dioxide have degassed, the lithium carbonate species no longer forms within the passivation layer. The traditional passivation layer is then present and the alleviation or elimination of the voltage delay phenomenon is no longer possible. A similar phenomena occurs in the cycling of a lithium-containing secondary cell.

Accordingly, there is needed a method for introducing a gaseous additive into the electrolyte intended for activating a lithium electrochemical cell, of either the primary or the secondary types, so that the intended concentration of additive is maintained throughout electrolyte preparation and filling of the casing. Maintaining the intended additive concentration in the electrolyte ensures alleviation, and in some cases elimination, of voltage delay throughout the useful life of the cell.

These and other objects of the present invention will become increasingly more apparent to those skilled in the art by reference to the following description.

DETAILED DESCRIPTION OF THE PREFERRED EMBODIMENTS

As used herein, the term "pulse" means a short burst of electrical current of a significantly greater amplitude than that of a prepulse current immediately prior to the pulse. A pulse train consists of at least two pulses of electrical current delivered in relatively short succession with or without open circuit rest between the pulses. A typical pulse current ranges from about 15.0 mA/cm$^2$ to about 30.0 mA/cm$^2$.

The electrochemical cell of the present invention is of either a primary chemistry or a secondary, rechargeable chemistry. For both the primary and secondary types, the cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred metal comprises lithium. An alternate negative electrode comprises a lithium alloy, such as lithium-aluminum alloy. The greater the amount of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. In the exemplary cell of the present invention, the negative electrode has an extended tab or lead of the same material as the current collector, i.e., preferably nickel, integrally formed therewith such as by welding and contacted by a weld to a cell case of conductive material in a case-negative electrical configuration. Alternatively, the negative electrode may be formed in some other geometry, such as a bobbin shape, cylinder or pellet to allow an alternate low surface cell design.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties which permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In either the primary cell or the secondary cell, the reaction at the positive electrode involves conversion of ions which migrate from the negative electrode to the positive electrode into atomic or molecular forms. For a primary cell, the cathode active material comprises at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

The metal oxide or the mixed metal oxide can be produced by the chemical addition, reaction, or otherwise intimate contact of various metal oxides and/or metal elements, preferably during thermal treatment or chemical vapor deposition in mixed states. The active materials thereby produced contain metals, oxides and sulfides of Groups IB, IIB, IIIB, IVB, VB, VIB, VIIB, and VIII of the Periodic Table of Elements, which includes the noble metals and/or other oxide compounds.

By way of illustration, and in no way intended to be limiting, an exemplary cathode active material comprises silver vanadium oxide having the general formula $Ag_xV_2O_y$ in any one of its many phases, i.e. β-phase silver vanadium oxide having in the general formula x=0.35 and y=5.18, γ-phase silver vanadium oxide having in the general formula x=0.80 and y=5.4 and ε-phase silver vanadium oxide having in the general formula x=1.0 and y=5.5, and combination and mixtures of phases thereof. For a more detailed description of silver vanadium oxide materials, reference is made to U.S. Pat. Nos. 4,310,609 to Liang et al., U.S. Pat. No. 5,389,472 to Takeuchi et al., U.S. Pat. No. 5,498,494 to Takeuchi et al. and U.S. Pat. No. 5,695,892 to Leising et al., all of which are assigned to the assignee of the present invention and incorporated herein by reference.

Another preferred transition metal oxide useful with the present invention is a composite cathode active material that includes $V_2O_z$ wherein z≦5 combined with $Ag_2O$ with the silver in either the silver(II), silver(I) or silver(0) oxidation state and CuO with the copper in either the copper(II), copper(I) or copper(0) oxidation state to provide the mixed metal oxide having the general formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about 0.01≦x≦1.0, about 0.01≦y≦1.0 and about 5.01≦z≦6.5. Typical forms of CSVO are $Cu_{1.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode active material is prepared in an oxidizing atmosphere such as air or oxygen, or in an inert atmosphere such as argon, nitrogen and helium. For a more detailed description of this cathode active material, reference is made to U.S. Pat. No. 5,472,810 to Takeuchi et al. and U.S. Pat.

No. 5,516,340 to Takeuchi et al., both of which are assigned to the assignee of the present invention and incorporated herein by reference.

Additional cathode active materials for a primary cell include manganese dioxide, cobalt oxide, nickel oxide, copper vanadium oxide, titanium disulfide, copper oxide, copper sulfide, iron sulfide, iron disulfide, and mixtures thereof.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To discharge such secondary cells, the lithium metal comprising the positive electrode is intercalated into the carbonaceous negative electrode by applying an externally generated electrical potential to recharge the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such active materials as manganese dioxide, silver vanadium oxide, titanium disulfide, copper oxide, copper sulfide, iron sulfide, iron disulfide and fluorinated carbon. However, this approach is comprised by problems associated with handling lithiated carbon outside the cell. Lithiated carbon tends to react when contacted by air or water.

The above described cathode active materials, whether of a primary or a secondary chemistry, are formed into an electrode body for incorporation into an electrochemical cell by mixing one or more of them with a conductive additive such as acetylene black, carbon black and/or graphite. Metallic materials such as nickel, aluminum, titanium and stainless steel in powder form are also useful as conductive diluents when mixed with the above listed active materials. The positive electrode of both a primary and a secondary cell further comprises a binder material which is preferably a fluoro-resin powder such as powdered polytetrafluoroethylene (PTFE) or powdered polyvinylidene fluoride (PVDF). More specifically, a preferred cathode active material for a primary cell comprises SVO in any one of its many phases, or mixtures thereof, and/or CSVO mixed with a binder material and a conductive diluent. A preferred cathode active material for a secondary cell comprises lithium cobalt oxide mixed with a binder material and a conductive diluent.

In that respect, a preferred positive electrode active admixture according to the present invention comprises from about 80% to 99%, by weight, of a cathode active material comprising either one or both of the SVO and CSVO materials for a primary cell or lithium cobalt oxide for a secondary cell mixed with a suitable binder and a conductive diluent. The resulting blended active mixture may be formed into a free-standing sheet prior to being contacted with a current collector to form the subject electrode. The manner in which the electrode mixture is prepared into a free-standing sheet is thoroughly described in U.S. Pat. No. 5,435,874 to Takeuchi et al., which is assigned to the assignee of the present invention and incorporated herein by reference. Further, electrode components for incorporation into both primary and secondary cells may also be prepared by rolling, spreading or pressing the electrode mixture of the present invention onto a suitable current collector. Electrodes prepared as described above may be in the form of one or more plates operatively associated with at least one or more plates of a counter electrode, or in the form of a strip wound with a corresponding strip of the counter electrode in a structure similar to a "jellyroll".

In order to prevent internal short circuit conditions, the positive electrode is separated from the negative electrode by a suitable separator material. The separator is of electrically insulative material, and the separator material also is chemically unreactive with the negative and positive electrode materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.). The separator may also be composed of non-woven glass, glass fiber materials and ceramic materials.

The form of the separator typically is a sheet which is placed between the negative and positive electrodes and in a manner preventing physical contact therebetween. Such is the case when the negative electrode is folded in a serpentine-like structure with a plurality of positive electrode plates disposed between the folds and received in a cell casing or when the electrode combination is rolled or otherwise formed into a cylindrical "jellyroll" configuration.

The primary and secondary electrochemical cells of the present invention further include a nonaqueous, ionically conductive electrolyte. The electrolyte serves as a medium for migration of ions between the negative and the positive electrodes during the electrochemical reactions of the cell, and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent system. For both a primary and a secondary cell, the electrolyte preferably comprises an alkali metal salt dissolved in a mixture of aprotic organic solvents comprising a low viscosity solvent including organic esters, ethers, dialkyl carbonates, and mixtures thereof, and a high permittivity solvent including cyclic carbonates, cyclic esters, cyclic amides, and mixtures thereof. Low viscosity solvents include tetrahydrofuran (THF), diisopropylether, methyl acetate (MA), diglyme, triglyme, tetraglyme, 1,2-dimethoxyethane (DME), 1,2-diethoxyethane (DEE), 1-ethoxy,2-methoxyethane (EME), dimethyl carbonate (DMC), diethyl carbonate (DEC), dipropyl carbonate (DPC), ethylmethyl carbonate (EMC), methylpropyl carbonate (MPC), ethylpropyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

The preferred electrolyte for both a primary and a secondary cell comprises a lithium salts selected from the group of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiNO_3$, $LiB(C_6H_5)_4$, $LiCF_3SO_3$, and mixtures thereof. Suitable salt concentrations typically range between about 0.8 to 1.5 molar.

In the present invention, the preferred primary electrochemical cell has a negative electrode of lithium metal and a positive electrode of the transition mixed metal oxide $AgV_2O_{5.5}$ (SVO). For this primary couple, the preferred activating electrolyte is 1.0M to 1.4M $LiAsF_6$ dissolved in an aprotic solvent mixture comprising at least one of the above listed low viscosity solvents and at least one of the above listed high permittivity solvents. The preferred aprotic solvent mixture comprises a 50/50 mixture, by volume, of propylene carbonate and 1,2-dimethoxyethane.

A preferred electrolyte for a secondary cell of a carbon/$LiCoO_2$ couple comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 09/669,936, filed Sep. 26, 2000, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

According to the present invention, electrolyte additive degassing is prevented by saturating the electrolyte with carbon dioxide while the preparation vessel resides in a gaseous carbon dioxide atmosphere. According to another embodiment of the present invention, the carbon dioxide saturated electrolyte is stored in a gaseous carbon dioxide atmosphere having a partial pressure sufficient to prevent evaporation of the gaseous additive. According to still another embodiment, electrochemical cells, of either a primary or a secondary type, are vacuum filled with the additive-containing electrolyte within the confines of a gaseous carbon dioxide atmosphere. The use of air or other inert gases such as helium, argon or nitrogen for preparation or storage of the electrolyte or for filling cells is unacceptable as carbon dioxide will still degas from the electrolyte to some extent.

The use of a carbon dioxide atmosphere greatly reduces or even eliminates lot to lot variations of dissolved carbon dioxide during preparation and storage of the electrolyte. Subsequently, the carbon dioxide concentration of the electrolyte within cells is more uniform and consistent than that known by the prior art. Improved cell performance with respect to alleviation or elimination of the voltage delay phenomenon results in an improved lithium/silver vanadium oxide primary cell, which can be used to power implantable cardiac defibrillators and the like. A carbon dioxide saturated electrolyte also results in a secondary cell with good cycling efficiency in comparison to secondary cells of the prior art.

The assembly of the primary and secondary cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction for either the exemplary primary or secondary cell of the present invention. As is well known to those skilled in the art, the exemplary primary and secondary electrochemical systems of the present invention can also be constructed in case-positive configurations.

It is appreciated that various modifications to the present inventive concepts described herein may be apparent to those of ordinary skill in the art without departing from the spirit and scope of the present invention as defined by the herein appended claims.

What is claimed is:

1. An electrochemical cell comprising a negative electrode, a positive electrode and a nonaqueous electrolyte, the improvement comprising:

the negative electrode comprised of lithium or the positive electrode comprised of a lithiated cathode active material and the nonaqueous electrolyte comprising at least one linear carbonate as a first solvent selected from the group consisting of dimethyl carbonate, diethyl carbonate, dipropyl carbonate, ethyl methyl carbonate, methyl propyl carbonate, ethyl propyl carbonate, and mixtures thereof, the electrolyte being saturated with carbon dioxide at the beginning of cell discharge.

2. The electrochemical cell of claim 1 wherein the carbon dioxide saturated electrolyte is characterized as having been prepared in a container residing in a gaseous carbon dioxide atmosphere.

3. The electrochemical cell of claim 1 wherein the carbon dioxide saturated electrolyte is characterized as having been stored in a gaseous carbon dioxide atmosphere after its preparation but before being used to activate the electrochemical cell, wherein the gaseous carbon dioxide atmosphere has a partial pressure sufficient to prevent evaporation of the carbon dioxide from the electrolyte.

4. The electrochemical cell of claim 1 wherein the carbon dioxide saturated electrolyte is characterized as having been filled into a casing housing the negative electrode and the positive electrode within the confines of a gaseous carbon dioxide atmosphere.

5. The electrochemical cell of claim 1 as either a primary or a secondary electrochemical cell.

6. The electrochemical cell of claim 1 wherein the electrochemical cell is a primary cell and the negative electrode is comprised of lithium or a lithium-aluminum alloy.

7. The electrochemical cell of claim 1 as a primary cell having the negative electrode comprised of lithium and the positive electrode of a cathode active material selected from the group consisting of silver vanadium oxide, copper silver vanadium oxide, manganese dioxide, cobalt oxide, nickel oxide, copper oxide, copper sulfide, iron sulfide, iron disulfide, titanium disulfide, copper vanadium oxide, and mixtures thereof.

8. The electrochemical cell of claim 1 wherein the electrolyte further comprises at least one of a second solvent and a third solvent, the second solvent selected from an ester, an ether, and mixtures thereof, and the third solvent selected from a cyclic carbonate, a cyclic ester, a cyclic amide, and mixtures thereof.

9. The electrochemical cell of claim 1 wherein the nonaqueous electrolyte further comprises a second solvent selected from the group consisting diisopropylether, 1,2-dimethoxyethane, 1,2-diethoxyethane, 1-ethoxy, 2-methoxyethane, methyl acetate, tetrahydrofuran, diglyme, triglyme, a tetraglyme, and mixtures thereof.

10. The electrochemical cell of claim 1 wherein the nonaqueous electrolyte further comprises a third solvent selected from the group consisting of propylene carbonate, ethylene carbonate, butylene carbonate, γ-valerolactone, γ-butyrolactone, N-methyl-pyrrolidinone, dimethyl sulfoxide, acetonitrile, dimethyl formamide, dimethyl acetamide, and mixtures thereof.

11. The electrochemical cell of claim 1 wherein the electrolyte includes a salt selected from the group consisting of $LiPF_6$, $LiAsF_6$, $LiSbF_4$, LiBF4, LiClO4, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiNO_3$, $LiB(C_6H_5)_4$, $LiCF_3$, $SO_3$, and mixtures thereof.

12. The electrochemical cell of claim 1 wherein the positive electrode comprises from about 80 to about 99 weight percent of a cathode active material.

13. The electrochemical cell of claim 12 wherein the positive electrode further comprises a binder material and a conductive additive.

14. The electrochemical cell of claim 13 wherein the binder material is a fluro-resin powder.

15. The electrochemical cell of claim 13 wherein the conductive additive is selected from the group consisting of carbon, graphite powder, acetylene black, titanium powder, aluminum powder, nickel powder, stainless steel powder, and mixtures thereof.

16. The electrochemical cell of claim 15 wherein the pulse current ranges from about 15.0 $mA/cm^2$ to about 30.0 $mA/cm^2$.

17. The electrochemical cell of claim 1 as a secondary cell and the lithiated cathode active material is selected from the group consisting of oxides, sulfides, selenides, and tellurides of metals selected from the group consisting of vanadium, titanium, chromium, copper, molybdenum, niobium, iron, nickel, cobalt, manganese, and mixtures thereof.

18. The electrochemical cell of claim 1 as a secondary cell having an anode material selected from the group consisting of coke, graphite, acetylene black, carbon black, glassy carbon, hairy carbon, and mixtures thereof.

19. The electrochemical cell of claim 1 wherein the electrolyte comprises at least three of the linear carbonates.

20. The electrochemical cell of claim 1 wherein the electrolyte comprises at least one cyclic carbonate selected from the group consisting of ethylene carbonate, propylene carbonate, butylene carbonate, vinylene carbonate, and mixtures thereof.

21. The electrochemical cell of claim 1 wherein the electrolyte comprises ethylene carbonate, dimethyl carbonate, ethyl methyl carbonate and diethyl carbonate.

22. The electrochemical cell of claim 21 wherein the ethylene carbonate is in the range of about 20% to about 50%, the dimethyl carbonate is in the range of about 12% to about 75%, the ethylmethyl carbonate is in the range of about 5% to about 45%, and the diethyl carbonate is in the range of about 3% to about 45%, by volume.

23. The electrochemical cell of claim 1 wherein the activated negative electrode and positive electrode provide the electrochemical cell dischargeable to deliver at least one pulse current of an electrical current of a greater amplitude than that of a prepulse current immediately prior to the pulse.

24. The electrochemical cell of claim 1 associated with an implantable medical device powered by the cell.

25. In combination with an implantable medical device requiring at least one pulse current for a medical device operating function, an electrochemical cell which is dischargeable to deliver the pulse current, the cell which comprises:
  a) a negative electrode;
  b) a positive electrode;
  c) a nonaqueous electrolyte comprising at least one linear carbonate selected from the group consisting of dimethyl carbonate, diethyl carbonate, dipropyl carbonate, ethyl methyl carbonate, methyl propyl carbonate, ethyl propyl carbonate, and mixtures thereof, and activating the negative electrode and positive electrode; and
  d) wherein the negative electrode is comprised of lithium or the positive electrode is comprised of a lithiated cathode active material and the nonaqueous electrolyte is saturated with carbon dioxide at the beginning of cell discharge.

26. A method for providing an electrochemical cell, comprising the steps of:
  a) providing a casing;
  b) housing a positive electrode and a negative electrode inside the casing, wherein at least one of the positive electrode and the negative electrode is comprised of lithium;
  c) preparing an electrolyte comprising at least one linear carbonate selected from the group consisting of dimethyl carbonate, diethyl carbonate, dipropyl carbonate, ethyl methyl carbonate, methyl propyl carbonate, ethyl propyl carbonate, and mixtures thereof, and having carbon dioxide provided therein in a desired concentration, wherein the electrolyte is prepared in a carbon dioxide atmosphere having a partial pressure greater than a partial pressure of the carbon dioxide provided in the linear carbonate in the desired concentration;

d) activating the positive electrode and the negative electrode with the electrolyte; and e) sealing the casing.

27. The method of claim 26 including filling the electrolyte in the casing in the carbon dioxide atmosphere.

28. The method of claim 26 including providing the cell as either a primary or a secondary electrochemical cell.

29. The method of claim 26 including providing the electrochemical cell as a primary cell and the negative electrode is comprised of lithium or a lithium-aluminum alloy.

30. The method of claim 26 including providing the electrochemical cell as a primary cell having the negative electrode comprised of lithium and selecting a cathode active material from the group consisting of silver vanadium oxide, copper silver vanadium oxide, manganese dioxide, cobalt oxide, nickel oxide, copper oxide, copper sulfide, iron sulfide, iron disulfide, titanium disulfide, copper vanadium oxide, and mixtures thereof.

31. The method of claim 26 including discharging the electrochemical cell to deliver at least one pulse current of an electrical current of a greater amplitude than that of a prepulse current immediately prior to the pulse.

32. The method of claim 26 including providing the electrochemical cell as a secondary cell and selecting the lithiated cathode active material from the group consisting of oxides, sulfides, selenides, and tellurides of metals selected from the group consisting of vanadium, titanium, chromium, copper, molybdenum, niobium, iron, nickel, cobalt, manganese, and mixtures thereof.

33. The method of claim 26 including providing the electrolyte comprising ethylene carbonate in a range of about 20% to about 50%, dimethyl carbonate in the range of about 12% to about 75%, ethyl methyl carbonate in the range of about 5% to about 45%, and diethyl carbonate in the range of about 3% to about 45%, by volume.

* * * * *

UNITED STATES PATENT AND TRADEMARK OFFICE
CERTIFICATE OF CORRECTION

PATENT NO. : 6,593,029 B2
DATED : July 15, 2003
INVENTOR(S) : Spillman et al.

It is certified that error appears in the above-identified patent and that said Letters Patent is hereby corrected as shown below:

<u>Title page,</u>
Item [73], please delete "Lancaster" and insert -- Clarence --;

<u>Column 9,</u>
Line 51, please delete "LiBF4, LiClO4" and insert -- $LiBF_4$, $LiClO_4$ --; and
Line 54, please delete "$LiCF_3$, $SO_3$" and insert -- $LiCF_3SO_3$ --.

Signed and Sealed this

Fourth Day of November, 2003

JAMES E. ROGAN
*Director of the United States Patent and Trademark Office*